United States Patent
Branning et al.

(10) Patent No.: US 9,097,273 B2
(45) Date of Patent: Aug. 4, 2015

(54) SELF-ALIGNING TELESCOPING INTERNALLY THREADED FASTENER

(71) Applicant: Economy Machine Products, Roanoke, IN (US)

(72) Inventors: Lin E. Branning, Larwill, IN (US); Julie A. Hartmus, Roanoke, IN (US); Eddie J. Hollenbaugh, Columbia City, IN (US); Patrick F. Sloan, Middlebury, IN (US); C. Jean Williams, Columbia City, IN (US); Jerod D. Williams, Huntington, IN (US)

(*) Notice: Subject to any disclaimer, the term of this patent is extended or adjusted under 35 U.S.C. 154(b) by 0 days.

(21) Appl. No.: 13/654,562

(22) Filed: Oct. 18, 2012

(65) Prior Publication Data

US 2013/0094923 A1   Apr. 18, 2013

Related U.S. Application Data

(60) Provisional application No. 61/548,348, filed on Oct. 18, 2011.

(51) Int. Cl.
F16B 43/00 (2006.01)
F16B 37/04 (2006.01)

(52) U.S. Cl.
CPC .................. F16B 37/043 (2013.01)

(58) Field of Classification Search
CPC .................................................. F16B 37/043
USPC ............. 411/115, 121, 128, 138, 143, 182, 411/172–177, 533, 55, 103, 147, 114, 141, 411/122, 109, 111, 112
See application file for complete search history.

(56) References Cited

U.S. PATENT DOCUMENTS

| | | | |
|---|---|---|---|
| 2,361,979 A | | 11/1944 | Tarwater Lawson et. al. |
| 2,991,816 A | * | 7/1961 | Harbison et al. ............... 411/111 |
| 4,723,881 A | * | 2/1988 | Duran ............................ 411/353 |
| 4,865,500 A | * | 9/1989 | Duran et al. ................... 411/103 |
| 5,065,490 A | * | 11/1991 | Wivagg et al. .............. 29/402.17 |
| 5,106,225 A | * | 4/1992 | Andre et al. ................ 403/408.1 |
| 5,135,341 A | * | 8/1992 | Leyder .......................... 411/182 |
| 5,399,052 A | * | 3/1995 | Volkmann et al. ............... 411/43 |
| 5,616,052 A | * | 4/1997 | Pan et al. ....................... 439/573 |
| 5,618,145 A | * | 4/1997 | Kuo .............................. 411/432 |
| 5,992,122 A | * | 11/1999 | Rohrmoser et al. ............. 52/698 |
| 6,896,460 B2 | * | 5/2005 | Enomoto et al. ................ 411/41 |
| 7,823,695 B2 | * | 11/2010 | Rosendahl et al. ............ 184/1.5 |
| 7,993,085 B2 | * | 8/2011 | McClure ......................... 411/55 |
| 2005/0169726 A1 | * | 8/2005 | McClure ......................... 411/55 |

* cited by examiner

Primary Examiner — Gary Estremsky

(57) ABSTRACT

A telescoping, self-aligning, fastener comprising a telescoping nut assembly flexibly connected to a companion sleeve, wherein said telescoping nut assembly comprises a nut and two or more extensions depending from said nut; said nut comprises a head and an internally threaded portion; said extensions are configured such that at least one slot is formed between each extension; said companion sleeve comprises an opening at one end configured to couple to a telescoping nut assembly, an opening at the opposite end configured to accept a male fastener portion, and said openings are connected by an interior cavity; and said telescoping nut assembly is able to rotate and translate relative to the companion sleeve.

25 Claims, 4 Drawing Sheets

SELF-ALIGNING TELESCOPING INTERNALLY THREADED FASTENER

CROSS-REFERENCES TO RELATED APPLICATIONS

This application claims priority to provisional U.S. application Ser. No. 61/548,348, A telescoping, articulating, free-spinning, self-aligning nut filed on Oct. 18, 2011 by Lin E. Branning, Julie A. Hartmus, Eddie J. Hollenbaugh, Patrick F. Sloan, C. Jean Williams, and Jerod D. Williams, which is incorporated in its entirety herein.

This application is related to co-pending PCT Application "Self-Aligning Telescoping Internally Threaded Fastener" filed on the same day as the present application.

STATEMENT REGARDING FEDERALLY SPONSORED RESEARCH OR DEVELOPMENT

Not applicable.

BACKGROUND

Internally threaded fasteners are used in numerous applications for fastening joints. A common embodiment of such a fastener is the hex nut, which can be coupled to an externally threaded male fastener portion, such as to affix an appurtenance onto a structure using compressive force generated by tightening the nut against the appurtenance. Often, the appurtenance to be attached has mounting holes, bores, or sleeves to accommodate the externally threaded male fastener portion. A spacer between the appurtenance and structure is sometimes required to create a stand-off, such as when excessive heat or vibration is a concern. Sometimes the male fastener portion is placed through a sleeve, which can act as a crush limiter when the appurtenance to be attached includes compressible materials such as rubber or plastic.

One disadvantage to internally threaded fasteners known to the art is that such fasteners must be aligned precisely with a male fastener portion to properly engage the threads. Such precise alignment can be difficult to achieve. Misalignment can cause the internally threaded fastener to fail prematurely or to exert insufficient clamping force after installation. To ensure proper alignment, internally threaded fasteners are generally started onto the male fastener portion by hand, which is a slow process. Further, fasteners known to the art often require the use of washers to provide stability. Since such washers are separate from the internally threaded fastener and the male fastener portion, they can easily become lost prior to or during installation, or if the internally threaded fastener fails or becomes cracked. Additionally, fasteners known to the art depend on the structural integrity of the internally threaded fastener to secure the connection. Should the internally threaded fastener crack or break, a connection secured by fasteners known to the art will fail.

There is a need in the art for an internally threaded fastener that self-aligns with a male fastener portion, increasing the speed of installation and decreasing the risk of mis-threading, cross-threading, insufficient clamping force, or premature connection failure. Embodiments of the present invention satisfy many of these needs. There is, further, a need in the art for fasteners that decrease the problems associated with separate washers and that provide a fail-safe means of connection if the internally threaded fastener fails. Embodiments of the present invention satisfy these needs. There is, further, a need in the art for fasteners that can retain connection with a male fastener member even if the internally threaded fastener cracks or breaks. Embodiments of the present invention satisfy these needs.

SUMMARY

Versions of the present invention overcome many deficiencies known to the art by providing a telescoping, self-aligning, internally threaded fastener. More particularly, the present invention relates to a fastener comprising a telescoping nut assembly and a companion sleeve. The telescoping nut assembly comprises an internally threaded nut with two or more extensions, said assembly flexibly coupled to a companion sleeve such that the telescoping nut assembly can move axially and radially within the sleeve. The connection between the telescoping nut assembly and the companion sleeve is configured such that the companion sleeve aids in the alignment of the telescoping nut assembly with a male fastener portion. Faster, easier, and more accurate installation of the internally threaded nut is thus achieved, particularly when installation occurs at an angle. Further, embodiments of the present invention can include a captive washer, eliminating the problems associated with a separate-piece washer. The structure of the invention, and specifically the interrelation of the telescoping nut assembly and companion sleeve when the nut is substantially fully engaged with a male fastener portion, further provides additional structural support to the internally threaded nut, reducing the odds of cracking. If the nut should crack or break, the companion sleeve of the present invention decreases the odds that the connection will fail by retaining the cracked or broken nut in connection with the male fastener portion. Further, even if the companion sleeve fails to retain the cracked or broken nut, embodiments of the extension portion and companion sleeve portion of the present invention comprise a secondary means for securing the male fastener portion, preventing complete failure of the connection.

The telescoping nut assembly and the companion sleeve are connected with an interference fit, specifically one in which the proximal opening of the companion sleeve is held captive between two portions of the telescoping nut assembly. Optionally, the interference fit connection is releasable. Versions of the present invention may include a washer held between the coupled telescoping nut assembly and companion sleeve.

Either the companion sleeve, the telescoping nut assembly, or both, may comprise one or more chamfers or tapers to aid in the alignment of male fastener portions. Optionally, the telescoping nut assembly extensions, companion sleeve interior cavity, or both, may comprise one or more fastener retaining portion for retaining a male fastener portion prior to threaded engagement of the nut.

In versions of the invention, the telescoping nut assembly extension fingers are configured to remove paint, debris, or other protruding imperfections from the external threads of a male fastener portion. Optionally, the nut may be configured with locking threads, or still further optionally may have threads treated with a chemical locking agent.

Those skilled in the art will recognize that many designs and embodiments of the present invention are possible, and that the invention is not limited to the specific embodiments discussed herein.

DESCRIPTION

Figure 1:
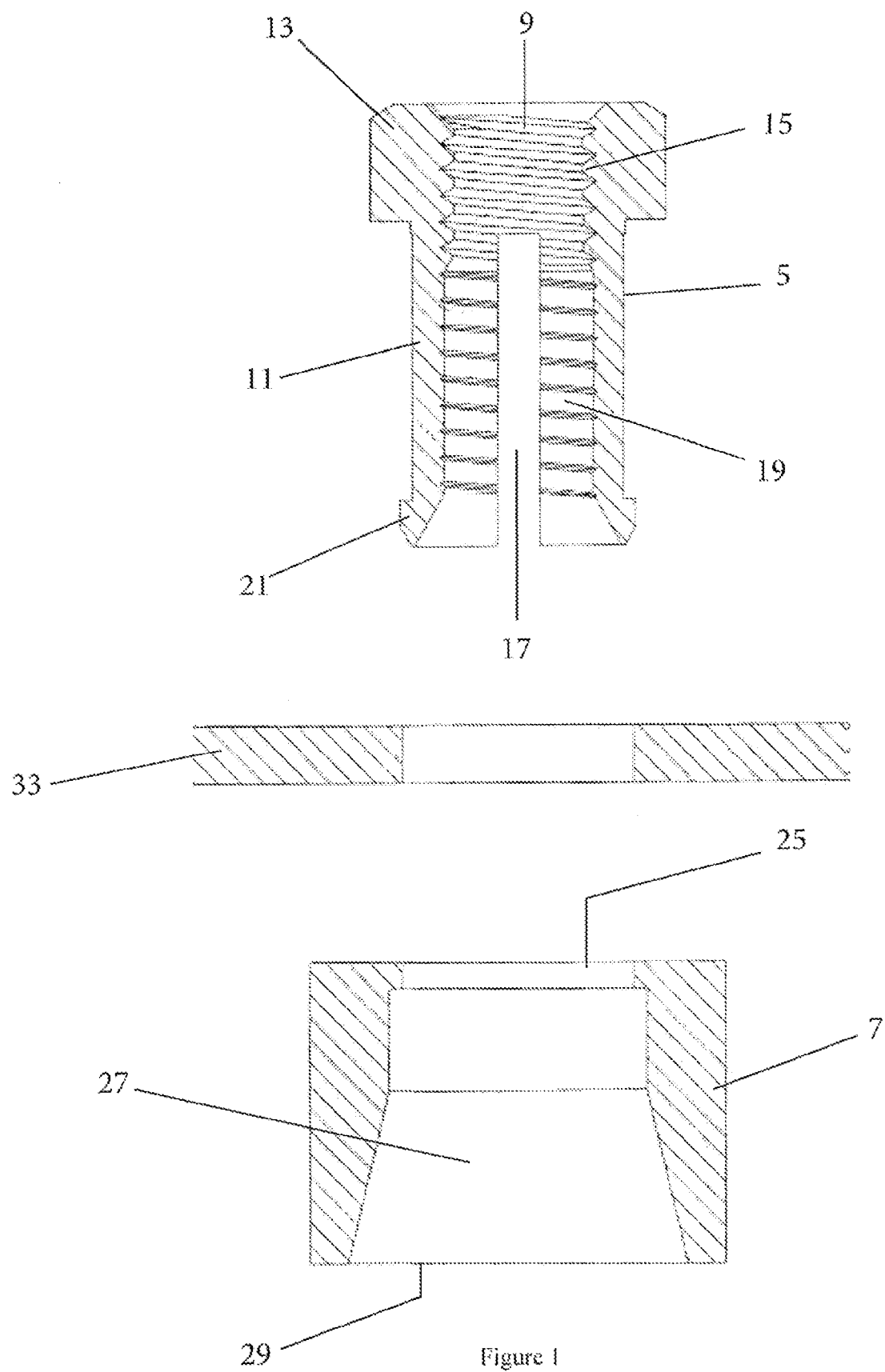
FIG. 1 shows an exploded cross-sectional view of a version of this invention including an optional captive washer.

Versions of the present invention are directed towards a self-aligning internally threaded fastener [1] for use in connection with an externally threaded fastener [3]. Herein, an externally threaded fastener portion [3] suitable for threaded connection to versions of the present invention will be referred to as a "male" fastener portion [3]. A self-aligning internally threaded fastener [1] of versions of the present invention comprises a telescoping nut assembly [5] coupled to a companion sleeve [7].

The telescoping nut assembly [5] comprises a nut [9] and extensions [11] depending from said nut [9]. The nut [9] comprises a head [13] and an internally threaded portion [15]. The head [13] comprises a shape adapted to enable rotation of the telescoping nut assembly [5] by hand or through the use of tools, said rotation intended to help achieve threaded connection of the nut [9] to a male fastener portion [3]. Suitable head [13] configurations will be apparent to one skilled in the art and include, in one version, a hexagonal shape. Optionally, the head [13] may be defined by the outer surface of the nut [9]. In some versions of the invention, the internally threaded portion [15] of the nut [9] is configured to lock to a male fastener portion [3] when the nut [9] is substantially fully engaged. The nut [9] can be configured to lock to a male fastener portion [3] with, by way of illustration, the use of locking threads in the internally threaded portion [15] or the use of a chemical locking compound known to the art in connection with the internally threaded portion [15]. Other methods of configuring the nut [9] to lock to the male fastener portion [3] while the nut is substantially fully engaged will be apparent to one skilled in the art. The internally threaded portion [15] may be configured according to any thread pattern, including American National Standard or metric screw threads, acme or stub acme threads, tapered pipe threads, or any special thread geometry required in a particular fastened joint. Optionally, the nut [9] can include a flange.

An extension [11] according to versions of the present invention comprises a finger depending from said nut [9]. Versions of the present invention comprise at least two extensions [11] depending from said nut [9]. Extensions [11] are configured such that at least one slot [17] separates the at least two extensions [11]. Optionally, the extensions [11] may further comprise a chamfer adapted to assist with alignment of a male fastener portion [3].

Optionally, the extensions [11] further comprise a fastener retaining portion [19] configured to preliminarily retain a male fastener portion [3] preparatory to engagement by the nut [9]. The fastener retaining portions [19] can comprise, by way of illustration, partial threading, full threading, inward protrusions, or annular rings. Other configurations for preliminary retention of a male fastener portion [3] within the scope of versions of the invention will be readily apparent to those skilled in the art. Optionally, the fastener retaining portion [19] can further comprise internal threading adapted to clear paint, debris, or other protruding imperfections from the external threads of a male fastener portion [3].

In some versions of the invention, extensions [11] are configured to be fully or partially flexible. In these versions of the invention, the extensions [11] may optionally be configured to form a void within the telescoping nut assembly [5] smaller than the diameter of a male fastener portion [3], such that if said male fastener portion [3] is pressed fully or partly into the void formed by the extensions [11], the extensions [11] preliminarily retain the male fastener portion [3] through friction. These versions of the invention may optionally include fastener retaining portions [19] to aid in retention of said male fastener portion [3]. The fastener retaining portions [19] can comprise annular rings, ridges, protrusions, or full or partial threading, as will be apparent to one skilled in the art. Optionally, the extensions [11] may further comprise one or more exterior protrusions [21] configured such that the exterior diameter of a portion of a portion of the telescoping nut assembly [5] is greater than the inner diameter of the proximal opening [25] of the companion sleeve [7]. In such embodiments, when the telescoping nut assembly [5] is pressed axially into the proximal opening [25] with sufficient force, the extensions [11] flex sufficiently to allow the protrusions [21] to pass the proximal opening [25]. Once the protrusions [21] pass the proximal opening [25], the extensions [11] relax and form an interference fit between the protrusions [21] and an exterior portion of the nut [9]. Such protrusions [21] can comprise, by way of illustration, one or more tabs, knobs bumps, ridges, or collars. Optionally, one or more of the extensions [11], protrusions [21], or both may further comprise an exterior bevel to facilitate such a press-in connection.

The telescoping nut assembly [5] can be made of any materials suitable for an internally threaded fastener. Suitable materials are well-known to those skilled in the art and include, by way of illustration, plastic, rubber, metals, and metal alloys.

A companion sleeve [7] of versions of the present invention comprises a sleeve of material forming a proximal opening [25], an interior cavity [27], and a distal opening [29]. The sleeve can be formed in any size and of any material adapted to assist alignment between the telescoping nut assembly [5] and male fastener portion [3], as will be apparent to one skilled in the art. The wall thickness, diameter, and height of the companion sleeve [7] are adapted to be sufficient to withstand deformation and buckling from the desired fastened joint tension between the nut [9] and the male fastener portion [3] when the nut [9] is substantially fully engaged. Optionally, the companion sleeve [7] may be configured as a spacer or as a crush limiter, as will be apparent to one skilled in the art. The companion sleeve [7] need not be tubular and may, by way of illustration, comprise flanges, grooves or other geometries. In versions of the invention, the companion sleeve [7] may further comprise rubber isolators or other components. Those skilled in the art will readily recognize that the exterior of the companion sleeve [7] may have a variety of shapes and inclusions within the scope of the present invention.

The proximal opening [25] comprises an opening adapted for connection with the telescoping nut assembly [5]. Optionally, the proximal opening [25] may further comprise an interior lip, ridge, or one or more protrusions adapted to create an interference fit with portions of the telescoping nut assembly [5], and particularly with portions of the extensions [11]. In some versions of the invention, one or more of the nut [9], nut head [13] or nut flange have an outer diameter larger than the diameter of the proximal opening [25]

The interior cavity [27] comprises a void extending from the proximal opening [25] the distal opening [29]. The interior cavity [27] has a diameter equal to or larger than the diameter formed by the exterior surfaces of the extensions [11]. In some versions of the invention, one or more of the nut [9], nut head [13] or nut flange have an exterior diameter larger than the diameter of the interior cavity [27]. Optionally, the interior cavity [27] can be fully or partially tapered such that the cavity is narrower at the interface with the proximal opening [25] than it is at the interface with the distal opening [29]. Such tapering can include, by way of illustration, a continuous angle taper, variable-angle taper, or stepped diameters. Optionally, the interior cavity [27] may further comprise features, protrusions, rings, or other geometries adapted to preliminarily retain a male fastener portion [3] prior to engagement by the telescoping nut assembly [5]. The configuration of such retention mechanisms will be apparent to one skilled in the art.

The distal opening [29] comprises an opening configured to accept a male fastener portion [3]. In some versions of the invention, the distal opening [29] further comprises a chamfer to aid in alignment with a male fastener portion [3]. Optionally, the distal opening [29] can be fully or partially tapered in cooperation with a tapered embodiment of the interior cavity [27].

In versions of the present invention, the telescoping nut assembly [5] and companion sleeve [7] are connected by an interference fit in which a portion of the companion sleeve [7] is captured between a portion of the exterior surface of the extensions [11] and a portion of the nut [9]. In some versions of the invention, the interference fit is created by retention of a portion of the proximal opening [25] between protrusions [21] of the extensions [11] on one side, and one or more of the nut [9], nut head [13], or nut flange on the other side. The interference fit is configured to permit the telescoping nut assembly [5] to move both axially and radially within the companion sleeve [7] such that the companion sleeve [7] assists with aligning the telescoping nut assembly [5] with a male fastener portion [3], particularly when installation at an angle is attempted. Optionally, the telescoping nut assembly [5] and companion sleeve [7] may be separate, but connectible through a press-in fit at the convenience of the user. Optionally, such connection may be releasable.

Figure 2:
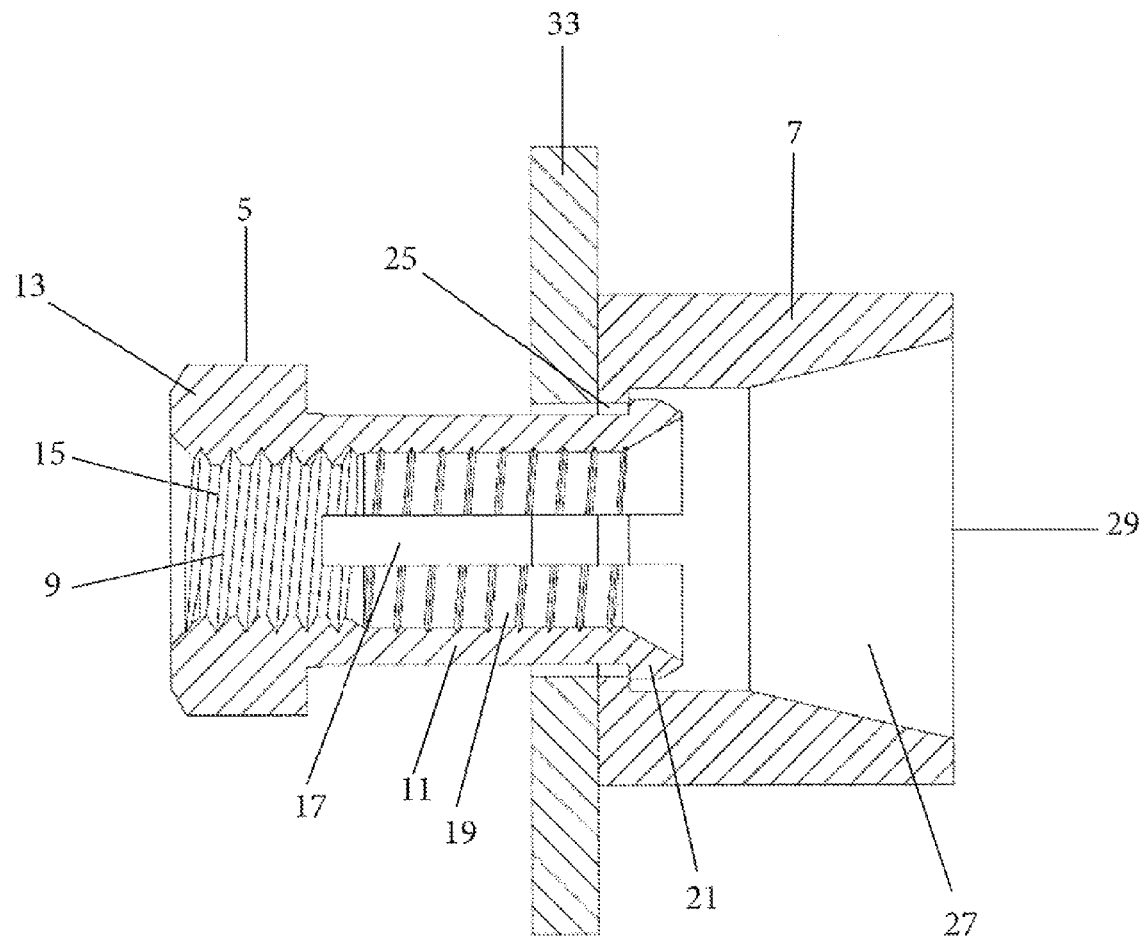
FIG. 2 shows a cross-sectional view of a version of this invention uncoupled from a male fastener portion.
Figure 3:
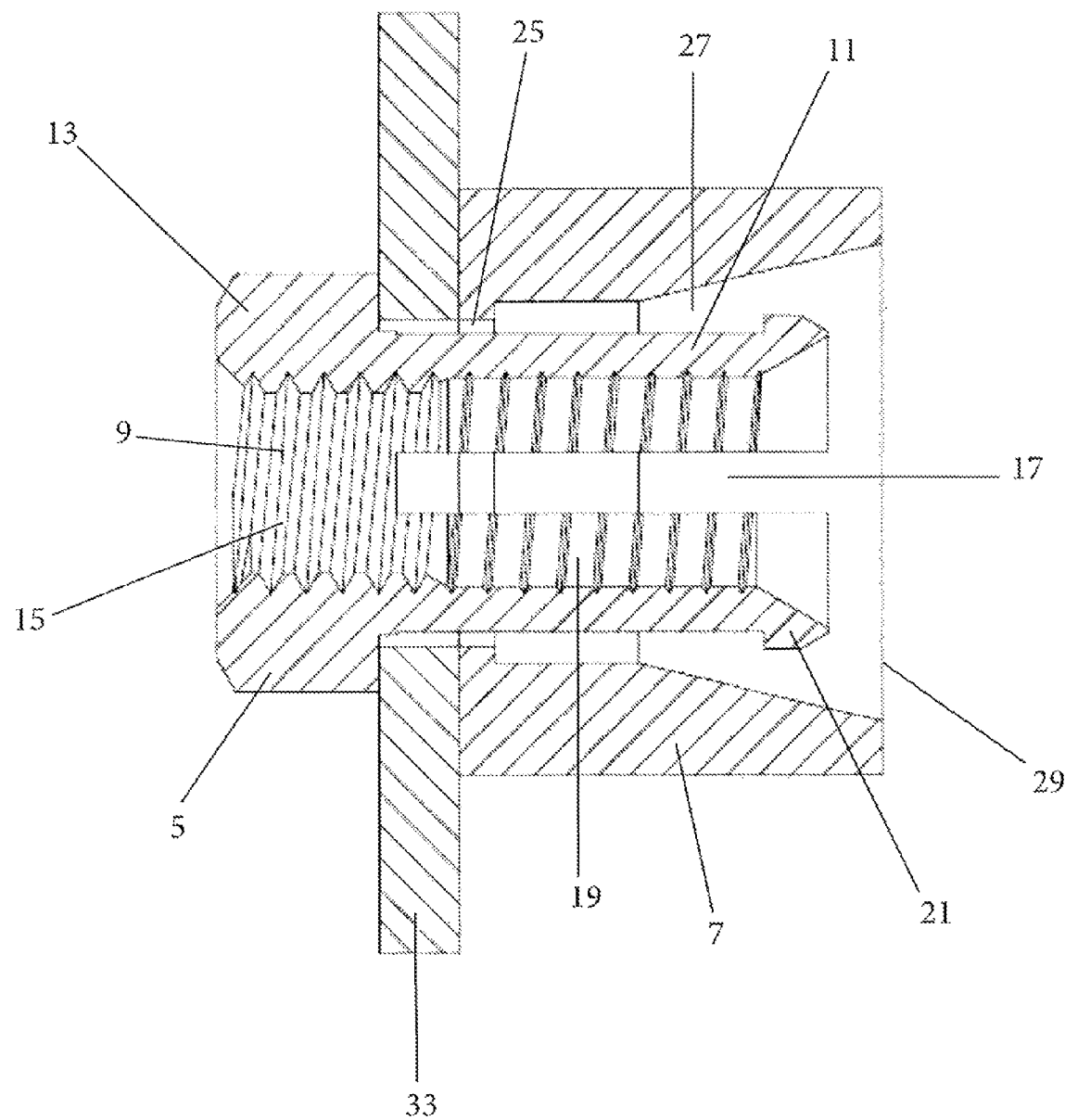
FIG. 3 shows a cross-sectional view of a version of this invention fully coupled to a male fastener portion.
Figure 4:
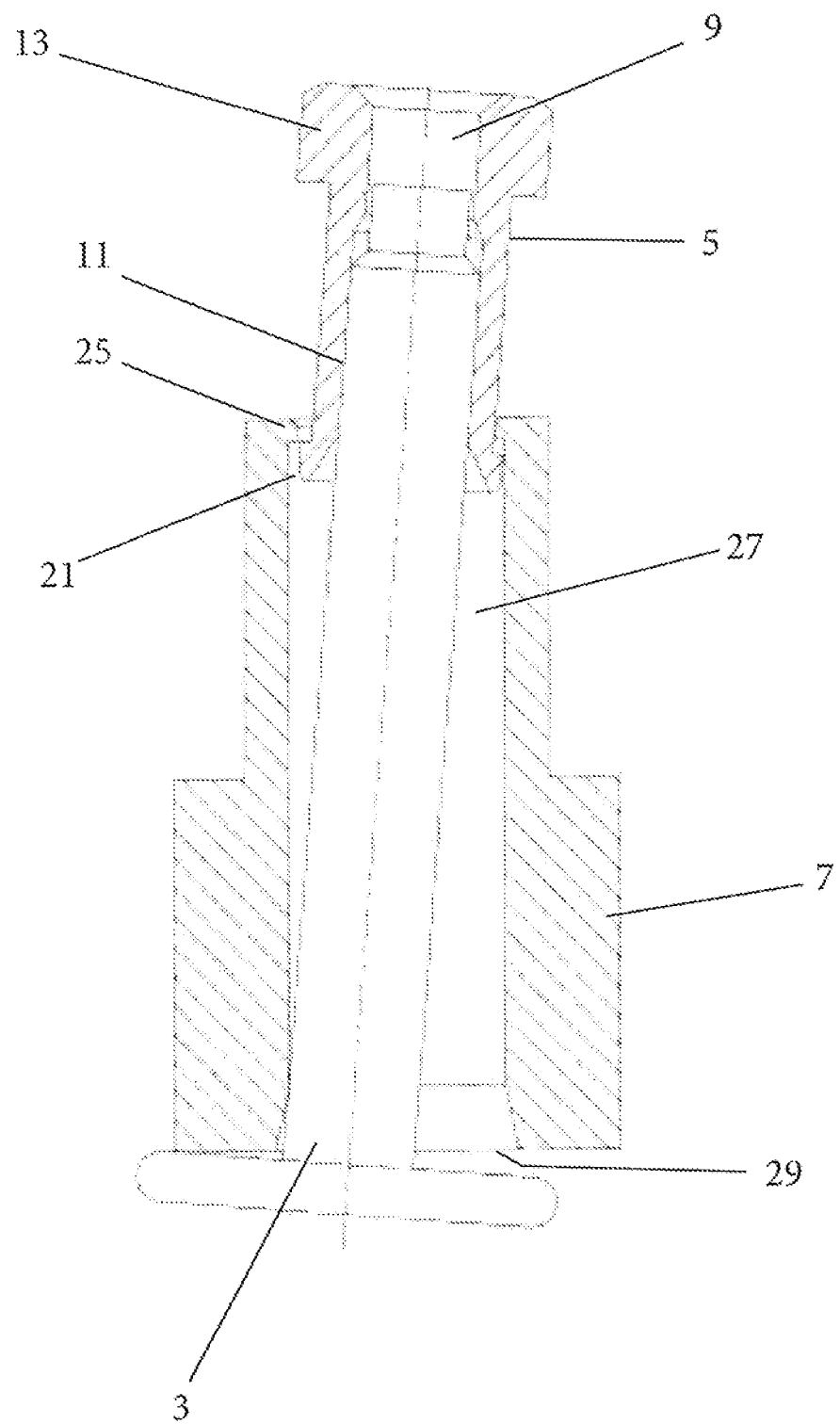
FIG. 4 show a cross sectional view of a version of this invention fully coupled to a male fastener portion wherein the fastener was installed at an angle to the male fastener portion.

In versions of the present invention, the fastener [1] is in a telescoped configuration when the nut [9] is not connected to a male fastener portion [3], as shown in FIG. 2. In the telescoped configuration, the telescoping nut assembly [5] can move axially and radially with respect to the companion sleeve [7]. As shown in FIG. 3, when the nut [9] is substantially fully engaged with the male fastener portion [3], the fastener [1] adapts to a compressed configuration, in which the extensions [11] are housed substantially within the companion sleeve [7], the nut [9] is substantially flush with the proximal opening [25] or with a washer [33] that is substantially flush with the proximal opening [25], and the nut [9] exerts compressive force on the companion sleeve [7]. In the compressed configuration, the telescoping nut assembly [5] is substantially fixed with respect to the companion sleeve [7].

Some versions of the invention may further comprise a washer [33] around the extensions [11] of the telescoping nut assembly [5]. The washer [33] has an outer diameter larger than at least one of the diameter of the proximal opening [25] of the companion sleeve [7] and the distal opening [29] of the companion sleeve [7]. The diameter of the central hole of the washer [33] is smaller than the diameter of at least one of the nut [9], nut head [13], or nut flange. The washer [33] is captive between the telescoping nut assembly [5] and the companion sleeve [7] when the telescoping nut assembly [5] and companion sleeve [7] are connected.

Although the present invention has been described in considerable detail with reference to certain preferred versions thereof, other versions are possible. For example, materials, shapes, head types, thread types, fastener retention methods, locking methods, interference fit configurations, and fastener applications other than those described in detail herein may be used for the versions of this invention. Therefore, the spirit and scope of the claims should not be limited to the description of the preferred versions described herein.

What is claimed is:

1. A self-aligning fastener comprising a telescoping nut assembly flexibly connected to a companion sleeve, wherein said telescoping nut assembly comprises a nut and two or more cantilevered extensions depending from said nut; said nut comprises a head and an internally threaded portion; said extensions form at least one slot, said slot comprises as void oriented substantially longitudinally along said extensions; said companion sleeve comprises a proximal opening configured to couple to as telescoping nut assembly, a distal opening configured to accept a male fastener portion, and said openings are connected by an interior cavity; and said telescoping nut assembly moves axially, radially and rotationally with respect to said companion sleeve when said nut is partially but not substantially engaged with as male fastener portion.

2. The fastener of claim 1 in which said two or more extensions further comprise a fastener retaining portion to retain a male fastener portion after said male fastener portion is pressed into said two or more extensions but prior to threaded engagement from turning said telescoping nut assembly with respect to said male fastener portion.

3. The fastener of claim 2 in which said fastener retaining portion comprises at least one of partial threading, full threading, inwardly-depending protrusions, and annular rings.

4. The fastener of claim 2 in which said fastener retaining portion acts in coordination with said at least one slot to clear one or more of debris, imperfections, or paint from the external threads of a male fastener portion.

5. The fastener of claim 2 in which when said male fastener portion is substantially fully engaged with said nut, said companion sleeve retains said male fastener portion and said telescoping nut assembly such that said male fastener portion remains substantially engaged with said telescoping nut assembly if said nut cracks or breaks.

6. The fastener of claim 1 in which said telescoping, nut assembly is retained in said companion sleeve by an interference fit.

7. The fastener of claim 6 further comprising a washer, in which said washer is captured in said interference fit.

8. The fastener of claim 7 in which the outer diameter of said washer is larger than said one or more of said companion sleeve proximal opening and said companion sleeve distal opening.

9. The fastener of claim 1 in which said interior cavity further comprises at least one taper such that the diameter of said interior cavity is greater at the portion of said interior cavity furthest from said nut than the diameter of the portion of said interior cavity nearest said nut.

10. The fastener of claim 9, wherein said fastener retaining portion retains a male fastener portion progressively more firmly the further said fastener retaining portion is pressed onto the threaded portion of said male fastener portion.

11. The fastener of claim 1 in which said nut further comprises a flange.

12. The fastener of claim 11 in which said flange is larger than said companion sleeve distal opening.

13. The fastener of claim 1 in which said internally threaded portion of said nut is configured to lock with the external threading of a male fastener portion when said nut and said male fastener portion are substantially fully engaged.

14. The fastener of claim 13 in which said internally threaded portion comprises locking threads.

15. The fastener of claim 13 in which said internally threaded portion is treated with a chemical locking compound.

16. A self-aligning fastener comprising a telescoping nut assembly flexibly connected to a companion sleeve, wherein said telescoping nut assembly comprises a nut and two or more cantilevered extensions depending from said nut; said nut comprises a head and an internally threaded portion; said extensions comprise at least one chamfer configured to assist alignment between said telescoping nut assembly and as male fastener portion; said extensions form at least one slot, said slot comprises a void oriented substantially longitudinally along said extensions; said extensions further comprising a fastener retaining portion adapted to retain a male fastener portion after said male fastener portion is pressed into said extensions but prior to threaded engagement from turning said telescoping nut assembly with respect to said male fastener portion; said companion sleeve comprises a proximal opening, a distal opening, and said openings are connected by an interior cavity; and said telescoping nut assembly moves axially, radially and rotationally with respect to said companion sleeve when said nut is not substantially engaged with a male fastener portion.

17. The fastener of claim 16 in which said extensions further comprise one or more fastener retaining portions, and said fastener retaining portions acts in coordination with said at least one slot to clear one or more of debris, imperfections, or paint from the external threads of as male fastener portion.

18. The fastener of claim 16 in which said interior cavity of said companion sleeve comprises at least one taper configured such that said proximal opening has a diameter smaller than said distal opening.

19. The fastener of claim 16 wherein when said male fastener portion is substantially fully engaged with said nut, said companion sleeve retains said male fastener portion and said telescoping nut assembly such that said male fastener portion remains substantially engaged with said telescoping, nut assembly if said nut cracks or breaks.

20. The fastener of claim 16 in which said telescoping nut assembly is retained in said companion sleeve by an interference fit.

21. The fastener of claim 20 further comprising a washer captured between said telescoping nut assembly and said companion sleeve.

22. A self-aligning fastener comprising a telescoping nut assembly, wherein said telescoping nut assembly comprises a nut and two or more cantilevered extensions depending from said nut; said nut comprises a head and an internally threaded portion; said extensions form at least one slot, said slot comprises a void oriented substantially longitudinally along said extensions; said extensions comprise at least one chamfer configured to assist alignment between said telescoping nut assembly and a male fastener portion; and said telescoping nut assembly moves axially, radially, and rotationally with respect to a bore when said telescoping nut assembly is placed in said bore and is not substantially fully engaged with a male fastener portion.

23. The fastener of claim 22 in which said two or more extensions further comprise a fastener retaining portion that retains a male fastener don after said fastener retaining portion is pressed onto said male fastener portion but prior to threaded engagement from turning said telescoping nut assembly with respect to said male fastener portion.

24. The fastener of claim 23, in which said fastener retaining portion comprises at least one of partial threading, full threading, inwardly-depending protrusions, and annular rings.

25. The fastener of claim 24 in which said fastener retaining portion acts in coordination with said at least one slot to clear one or more of debris, imperfections, or paint from the external threads of a male fastener portion during turning or sliding engagement between said male fastener onion and said fastener retaining portion.

* * * * *